Figure 2:
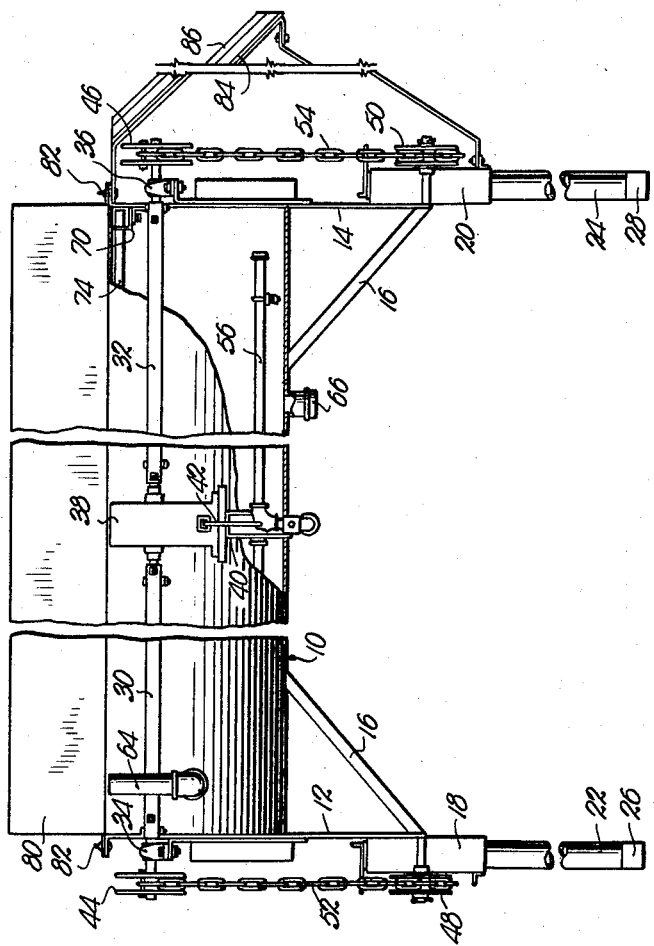

Feb. 16, 1960

R. S. ZEBARTH 2,924,845

APPARATUS FOR PROCESSING POULTRY HAVING
MEANS FOR LOCALIZED SCALDING

Original Filed Feb. 23, 1954

INVENTOR.
Ralph S. Zebarth
BY
ATTORNEY.

United States Patent Office 2,924,845
Patented Feb. 16, 1960

2,924,845

APPARATUS FOR PROCESSING POULTRY HAVING MEANS FOR LOCALIZED SCALDING

Ralph S. Zebarth, Hickman Mills, Mo., assignor to Gordon Johnson Company, Kansas City, Mo., a corporation of Missouri Original application February 23, 1954, Serial No. 411,749, now Patent No. 2,830,318, dated April 15, 1958. Divided and this application September 12, 1957, Serial No. 683,602

12 Claims. (Cl. 17—11.2)

This invention relates to the art of dressing poultry and particularly to the scalding of birds preparatory to removal of the feathers, the primary object being to provide novel apparatus for carrying out a method of multiple scalding wherein differing parts of the birds are successively subjected to scalding liquids of differing temperatures.

It is the universal practice in this field to prepare poultry for picking by scalding of the entire bird in a single step wherein immersion takes place in a hot water bath at a predetermined scalding temperature. Such temperature cannot be sufficiently high however to assure easy picking of all parts of the bird because of "barking" of the skin by mechanical pickers. Such pickers have been developed to a point of efficiency however where the only difficulty lies in the hard to remove feathers of the hocks, the neck and the wing tips.

In using the apparatus of the present invention, the poultry is first subjected to a primary scalder which includes immersion of the entire bird. Thereupon, the head, neck and wing-tips of the bird are immersed in a second hot water bath having a substantially higher scalding temperature than the scalding water in which the entire bird is immersed. Finally, the hocks are immersed in a third hot water bath that is likewise maintained at a scalding temperature higher than the temperature of the first bath.

By following such steps in using the apparatus feathers around the neck and at the tips of the wings, as well as the feathers on the legs of the fowl, are additionally treated, and when the bird is thereupon subjected to automatic picking machines, all of the feathers will be quickly and cleanly removed, minimizing the amount of additional treatment by hand.

The apparatus for carrying out the successive steps consists of a number of vats containing the scalding liquids, each of which is provided with an overlying grill upon which the bird slides as it is advanced. The grill is composed of a plurality of removable rods so spaced as to present slots through which the neck and wing-tips or the legs protrude into the hot liquid as the body slides upon the rods. If desired, upon complete removal of the grill, the vat may be used to immerse the entire bird.

It is, therefore, the most important object of the present invention to provide multiple scalding of poultry wherein those parts of the bird having feathers most difficult to remove are immersed in hot water baths of relatively high temperatures.

Another important object of the present invention is to provide apparatus that includes an open top, hot water vat, together with a grill for slidably supporting the bird as it is advanced horizontally, and made to present elongated slots through which parts of the bird protrude when the additional scalding steps are performed.

A further important object is to provide a multiple scalding machine including means to guide the birds to the grill as the same are advanced through use of an overhead conveyor or the like, together with structure permitting raising and lowering of the vat and, therefore, the grill thereon, depending upon the size of the birds to be scalded.

This is a division of my co-pending application, Serial No. 411,749, filed February 23, 1954 and now Patent No. 2,830,318.

Figure 1:
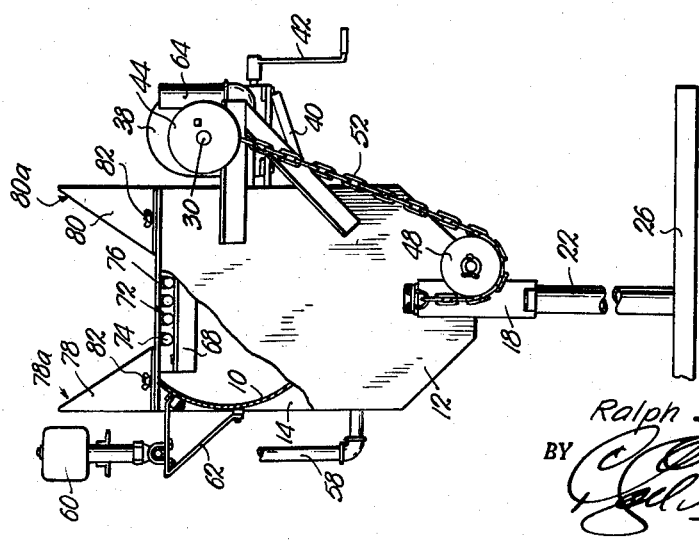

In the drawing:

Figure 1 is an end elevational view of apparatus for processing poultry having means for localized scalding made pursuant to the present invention and capable of carrying out the method of the invention, parts being broken away to reveal details of construction; and Fig. 2 is a fragmentary side elevational view thereof, parts being broken away for clearness.

Referring first to the novel apparatus forming the subject matter of the present invention, there is illustrated in Figs. 1 and 2 of the drawing, an elongated, open top vat broadly designated by the numeral 10 that is preferably arcuate in transverse, cross-section as shown most clearly in Fig. 1.

The ends of the vat are closed by vertical plates 12 and 14 that extend downwardly below the vat 10 and which are reinforced by braces 16 joining with the vat 10 therebelow.

Plates 12 and 14 have sleeves 18 and 20 respectively, rigidly secured thereto adjacent their lowermost ends which are in turn slidably mounted on standards 22 and 24 respectively for vertical reciprocation thereon. The T-shaped standards 22 and 24 are supported by cross bars 26 and 28 respectively at their lowermost ends.

The sleeves 18 and 20, and therefore, the vat 10, and all of its associated parts, may be raised and lowered by rotation of a pair of aligned shafts 30 and 32 rotatably carried by bearings 34 and 36 suitably mounted on the plates 12 and 14 respectively. The shafts 30 and 32 are operably connected with a gear reduction unit 38 that is carried by bracket means 40 on the vat 10 and manually controlled by a handle 42 operably connected therewith.

Winch sheaves 44 and 46 are secured to the outermost ends of the shafts 30 and 32 respectively, and pulleys 48 and 50 are rotatably mounted on sleeves 18 and 20 respectively. A chain 52 joined at one end thereof to the sheave 44, passes around the pulley 48 and is joined at its opposite end to the uppermost end of the standard 22. A second chain 54 is coupled with the sheave 46, passes around the pulley 50 and joins with the standard 24 at the uppermost end of the latter.

A perforated steam manifold 56, mounted in the vat 10, is coupled with a supply pipe 58 having a steam control valve 60 interposed therein and mounted on a bracket 62 carried by the vat 10 in opposed relationship to the gear reduction unit 38. An open top, swingable overflow pipe 64 is provided to regulate the level of hot water in the vat 10 and the latter may be drained for cleaning by removal of a plug 66.

The plates 12 and 14 carry Z-shaped brackets 68 and 70 on their innermost faces within the vat 10 adjacent the open top thereof for supporting an elongated grill coextensive in length with the vat 10 and broadly designated by the numeral 72. Grill 72 is composed of a plurality of elongated rods 74 held in spaced-apart parallelism by the brackets 68 and 70 by virtue of open top notches 76. The notches 76 saddle the rods 74 and permit removal thereof, it being noted that by virtue of the spacing of the rods 74, there is presented a number of elongated slots extending longitudinally of the vat 10.

The plates 12 and 14 support a pair of spaced, elongated guides 78 and 80 co-extensive in length with the vat 10 and shiftable toward and away from each other upon loosening of fasteners 82 serving to interconnect the guides 78 and 80 with plates 12 and 14. Guides 78 and 80 have transversely inclined, opposed walls 78a and 80a that converge as the open top of the vat 10 is approached, whereby to present a passageway for birds to be scalded.

When the scalding apparatus is placed in use, birds are directed thereto through utilization of an overhead conveyor (not shown) from which the birds are suspended through use of suitable shackles on the lowermost ends of flexible chains that are in turn attached to the conveyor. As the horizontally moving poultry approaches the scalding apparatus shown in the drawing, it moves into engagement with an inclined shelf 84 at one end of the vat 10 having flange means 86 thereon to guide the birds to a position between the guides 78 and 80 as the birds move upwardly along the shelf 84 to the vat 10.

In placing the apparatus of the present invention in use, it is to be preferred that three separate scalders of the kind shown in the drawing, be utilized. The first of such scalders shall be employed to completely immerse the bird and thereby subject the same to the scalding temperatures of the liquid contained in the vat 10. To this end, therefore, the said first scalding apparatus will have the grill 72 thereof entirely removed and this may be accomplished simply by lifting upwardly on the rods 74 that are saddled in the notches 76.

The vat 10 is filled with water and heated to a predetermined scalding temperature (usually approximately 125° F. to 130° F.), by directing steam thereto past the valve 60, through the supply pipe 58 and thence into the vat 10 by way of manifold 56. The level of water in the vat 10 will be maintained by proper manipulation of the overflow pipe 64 and the vat 10 will be raised to a predetermined height through manipulation of handle 42 so that the entire bird will be subjected to the action of the scalding water by complete immersion therein.

As the handle 42 is operated, the shafts 30 and 32 will be rotated to wind or unwind the chains 52 and 54 on the winch drums 44 and 46. This shortening or lengthening of the chains 52 and 54 causes the pulley wheels 48 and 50, together with the sleeves 18 and 20, to reciprocate vertically on the standards 22 and 24.

The birds are thereupon subjected to a second scalder of the type illustrated in the drawing, it being understood that the birds are initially placed upon the shackles for suspension by their feet. The second scalder is employed through use of a portion of the grill 72, namely, the two innermost rods 74. These two rods serve to support the body of the bird with the neck protruding downwardly through the slot between the two innermost rods and with the wing-tips also extending below the grill 72 and into the water of the underlying vat. This water should be maintained at a substantially higher temperature (approximately 140° F. to 145° F.), than that of the first scalder and as the birds progress, the bodies thereof slide on the two innermost rods 74, while the head, neck and wing-tips are subjected to the action of the hot water by immersion therein.

The birds are thereupon directed through a suitable machine for partial picking of the feathers and then are reversed on the shackles for suspension by the necks. They are then subjected to a third scalder of the type shown in Figs. 1 and 2 of the drawing, modified only by utilizing only one of the rods 74 of the grill 72.

The temperature of the water in the third scalder should likewise be substantially higher (i.e. 140° F. to 145° F.), than the temperature of the water used in the first complete immersion and as the bodies of the birds slide along the single rod 74 of the grill 72, the hocks of the birds straddling such rod 74 will be immersed in the hot water slightly above the garter area and subjected to the scalding action thereof.

Summarizing therefore, the novel features included in the method of the present invention consist of passing the birds through three separate scalders in regular sequence, immersing the entire bird in the first scalder and thereupon only portions of the birds in the successive scalding steps, making it possible to use different temperatures on different parts of the bird.

By virtue of the provision of a scalder that includes adjustable grillwork 72, additional scalding may take place in a manner to permit only part of the poultry to enter the water while the remaining portions thereof are held out of the scalding liquid. The guides 78 and 80 at the sides of the scalders, work in combination with the grill 72 to guide the birds in such a way that the desired birds only will enter the second and third scalders.

Still another important feature lies in the way in which the scalder may be raised and lowered to accommodate birds of different sizes and hold the same in proper position with respect to the hot water vats therebelow so that varying amounts of the legs and necks may be scalded.

Having thus described the invention what is claimed as new and desired to be secured by Letters Patent is:

1. In a poultry scalder, an elongated, open top, hot water vat; and a poultry-supporting grill overlying the vat above the level of hot water therein and provided with at least one slot coextensive in length with the length of the vat for receiving parts of the poultry depending therefrom into said hot water as the poultry is caused to slide along the upper surface of the grill.

2. In a poultry scalder, an elongated, open top, hot water vat; and a poultry-supporting grill overlying the vat above the level of hot water therein and including a pair of spaced, parallel rods, presenting a slot coextensive in length with the length of the vat for receiving parts of the poultry depending therefrom into said hot water as the poultry is caused to slide along the upper surface of the grill.

3. In a poultry scalder, an elongated, open top, hot water vat; a poultry-supporting grill overlying the vat above the level of hot water therein and including a plurality of spaced, parallel rods, presenting a number of slots coextensive in length with the length of the vat for receiving parts of the poultry depending therefrom into said hot water as the poultry is caused to slide along the upper surface of the grill; and brackets at the ends of the vat supporting the rods.

4. In a poultry scalder, an elongated, open top, hot water vat; a poultry-supporting grill overlying the vat above the level of hot water therein and including a plurality of spaced, parallel rods, presenting a number of slots coextensive in length with the length of the vat for receiving parts of the poultry depending therefrom into said hot water as the poultry is caused to slide along the upper surface of the grill; and brackets at the ends of the vat supporting the rods, each bracket having a number of open top notches, presenting saddles for removably receiving the rods.

5. In a poultry scalder, an elongated, open top, hot water vat; and a pair of spaced, elongated guides mounted on the vat and having transversely inclined, opposed walls converging as the open top of the vat is approached, presenting a passageway coextensive in length with the vat.

6. In a poultry scalder, an elongated, open top, hot water vat; supporting means for the vat; structure mounting the vat on said supporting means for vertical reciprocation; and apparatus mounted on the vat and operably interconnecting said supporting means and said structure for raising and lowering the vat.

7. In a poultry scalder, an elongated, open top, hot water vat; a poultry-supporting grill overlying the vat above the level of hot water therein and provided with at least one slot coextensive in length with the length of the vat for receiving parts of the poultry depending therefrom into said hot water as the poultry is caused to slide along the upper surface of the grill; and a pair of spaced, elongated guides mounted on the vat and having transversely inclined, opposed walls converging as the open top of the vat is approached, presenting a passageway coextensive in length with the vat.

8. In a poultry scalder, an elongated, open top, hot water vat; a poultry-supporting grill overlying the vat above the level of hot water therein and provided with at least one slot coextensive in length with the length of the vat for receiving parts of the poultry depending therefrom into said hot water as the poultry is caused to slide along the upper surface of the grill; supporting means for the vat; structure mounting the vat on said supporting means for vertical reciprocation; and apparatus mounted on the vat and operably interconnecting said supporting means and said structure for raising and lowering the vat.

9. In a poultry scalder, an elongated, open top, hot water vat; a pair of spaced, elongated guides mounted on the vat and having transversely inclined, opposed walls converging as the open top of the vat is approached, presenting a passageway coextensive in length with the vat; supporting means for the vat; structure mounting the vat on said supporting means for vertical reciprocation; and apparatus mounted on the vat and operably interconnecting said supporting means and said structure for raising and lowering the vat.

10. In a poultry scalder, an elongated, open top, hot water vat; a poultry-supporting grill overlying the vat above the level of hot water therein and provided with at least one slot coextensive in length with the length of the vat for receiving parts of the poultry depending therefrom into said hot water as the poultry is caused to slide along the upper surface of the grill; a pair of spaced, elongated guides mounted on the vat and having transversely inclined, opposed walls converging as the open top of the vat is approached, presenting a passageway coextensive in length with the vat; supporting means for the vat; structure mounting the vat on said supporting means for vertical reciprocation; and apparatus mounted on the vat and operably interconnecting said supporting means and said structure for raising and lowering the vat.

11. In a poultry scalder, an elongated, open top, hot water vat; a poultry-supporting grill overlying the vat above the level of hot water therein and including a plurality of spaced, parallel rods, presenting a number of slots coextensive in length with the length of the vat for receiving parts of the poultry depending therefrom into said hot water as the poultry is caused to slide along the upper surface of the grill; brackets at the ends of the vat supporting the rods; and a pair of spaced, elongated guides mounted on the vat and having transversely inclined, opposed walls converging as the open top of the vat is approached, presenting a passageway coextensive in length with the vat.

12. In a poultry scalder, an elongated, open top, hot water vat; a poultry-supporting grill overlying the vat above the level of hot water therein and including a plurality of spaced, parallel rods, presenting a number of slots coextensive in length with the length of the vat for receiving parts of the poultry depending therefrom into said hot water as the poultry is caused to slide along the upper surface of the grill; brackets at the ends of the vat supporting the rods; a pair of spaced, elongated guides mounted on the vat and having transversely inclined, opposed walls converging as the open top of the vat is approached, presenting a passageway coextensive in length with the vat; supporting means for the vat; structure mounting the vat on said supporting means for vertical reciprocation; and apparatus mounted on the vat and operably interconnecting said supporting means and said structure for raising and lowering the vat.

References Cited in the file of this patent

UNITED STATES PATENTS

| 1,534,207 | Foster | Apr. 21, 1925 |
| 2,637,066 | Johnson | May 5, 1953 |
| 2,642,618 | Stubelek | June 23, 1953 |